March 1, 1949.
H. W. WALDEN
2,463,226
LATERALLY STABILIZED WHEEL OF
THE LOAD-SUSPENSION TYPE
Filed Feb. 21, 1947
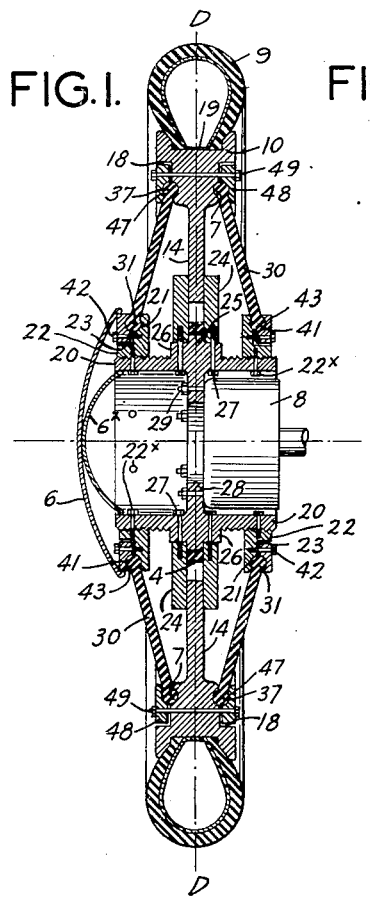
INVENTOR.
HENRY W. WALDEN
BY
ATTORNEY.

Patented Mar. 1, 1949

2,463,226

UNITED STATES PATENT OFFICE 2,463,226

LATERALLY STABILIZED WHEEL OF THE LOAD-SUSPENSION TYPE

Henry W. Walden, New York, N. Y.

Application February 21, 1947, Serial No. 730,031

3 Claims. (Cl. 152—47)

This invention relates to wheels for automobiles, motorcycles and other land vehicles, and to landing wheels for airplanes, of the type which has a pair of spaced annular rubber diaphragms in the center opening of which is secured the wheel axles or hubs, the perimetric or distal portions of the rubber diaphragms being secured to the rim or felly of the wheel so that the car weight is carried by suspension of the upper portions of the diaphragms which are thus enabled by reason of their inherent resiliency, to take up shock. The type of rubber diaphragm wheel has provision for adjusting the rubber diaphragms, by varying the distance separating them at their central securement, to provide the best resilience and shock-absorbing properties for particular conditions.

One of the important objects of this invention is to provide a rubber-diaphragm wheel of the type referred to which will have provisions for assuring lateral stability. An allied object is to provide a laterally stabilized rubber-diaphragm wheel of the type referred to, in which lateral or axial movement of the central portions of the pair of rubber diaphragms and the axle carried thereby are restrained in a manner not to impair the resilient suspension action of the rubber diaphragms.

Another important object of the invention is to provide a rubber-diaphragm wheel of the type referred to which is readily secured to the customary brake-drum of an automobile axle assembly. An allied object is to provide a ready securement of a rubber-diaphragm wheel to the vehicle, which will, at the same time permit the aforesaid diaphragm adjustment. A further object is to provide a laterally-stabilized rubber diaphragm wheel which can be conveniently adjusted to regulate the aforesaid diaphragm spacing. Still another object of the invention is to provide a laterally-stabilized rubber diaphragm wheel which is readily secured to the customary brake-drum of an automobile axle assembly.

For the attainment of the foregoing and such other objects as may appear or be pointed out herein I have shown two embodiments of my invention in the accompanying drawing wherein:

Fig. 1 is an elevational section through the improved wheel in one form of the invention provided with continuous or annular lateral stabilizing means;

Fig. 2 is a front view of the wheel of Fig. 1;

Fig. 3 is an elevational section through a second form of improved wheel in which the lateral stabilizing means is not continuous or annular, but provided at spaced points annularly about the wheel; and Fig. 4 is a front view of the wheel of Fig. 3.

The improved wheel comprises an annular rim member 10 having a central annular recess 19 for a pneumatic tire 9, and a tubular hub member 20 which is secured to the brake-drum 8 of the wheel assembly and is associated with rim member 10 in a manner fully described presently. The internal diameter of tubular hub member 20 is sufficiently large to enable it, and the heads of certain bolts subsequently described, to receive brake-drum 8. Tubular member 20 is provided with an inwardly-directed, annular flange 28, disposed on the central diametrical plane D—D through the wheel, which annular flange abuts against the outer wall of the brake-drum; the hub member and wheel is secured to the brake-drum of the axle assembly by annularly spaced bolts 29.

Hub member 20 is associated with the rim member 10 by a pair of thick rubber diaphragms 30, 30 in the form of an annulus with a central opening for the hub member, one on each side of the central plane D—D of the wheel. Rubber diaphragms 30, 30 are provided with a peripheral or distal enlargement or bead 37 and an inner or proximal bead 31 which defines the central opening for the hub member. The main body of rubber diaphragms 30, 30 is elastic; the beaded portions 31, 37 may be corded for additional strength at these points. The peripheral beads 37, 37 of the rubber diaphragms serve to secure the outer perimeter of the diaphragms to rim member 10. For this purpose, the side faces of annular rim 10 is provided with an annular cavity or groove 7 in which substantially half of the peripheral bead 37 snugly fits. After seating the peripheral beads 37, 37 of the two rubber diaphragms in their respective annular grooves 7 of the annular rim 10, the rubber diaphragms are secured by means of a pair of perimetric rings 48, 48 one on each side of the wheel. Perimetric rings 48 are provided with annular cavities or grooves 47 in which the outward, substantial halves of the peripheral beads 37 snugly fit. Perimetric rings 48, 48 are received in annular recesses or rabbets 18, 18 provided on each side of rim member 10, and are secured thereto, as by means of through bolts 49 passed through aligned holes of the rim 10 and rings 48.

Hub member 20 is provided with external threads, which is right-handed on one side of central plane D—D and left-handed on the other side. On each end of the threaded hub member is screwed an L-shaped ring 22. The upright (annular) legs of the L are disposed inwardly to provide outwardly-disposed, annular recesses or rabbets 23, 23, in which are received hub rings 43 which are secured to the L-shaped rings, as by means of bolts 42. The L-shaped rings 22, 22 are provided with outward, annular grooves or cavities 21 in which are snugly received the proximal beads 31 of rubber diaphragms 30, 30. Hub rings 43, 43 are provided with annular cavities or grooves 41 in which the outward, substantial halves of the proximal beads 31, 31 of the rubber diaphragms are snugly received.

For the purpose of giving the improved wheel lateral stability, as explained in the statement of invention, rim member 10 is provided with an inwardly-directed annular flange 14 centrally disposed on diametric plane D—D, which is slidably received between two lateral rings 24, 24 secured to hub member 20. For the purpose of securing lateral rings 24, 24 on hub member 20 in a manner to permit facile assembly, the hub member is provided with a step 25 disposed centrally on diametric plane D—D and of a width substantially that of the thickness of annular rim flange 14. On each side of central step 25 are shoulders 26, 26 of a width substantially that of lateral rings 24, 24 so as to present an annular recess or rabbet therefor. Lateral rings 24, 24 are secured to the hub member 20, as by means of bolts 27. With the two lateral rings 24, 24 bolted in place, there is thus provided an annular channel in which the rim flange 14 is slidably received.

The improved wheel is assembled in the following manner: One of the lateral rings 24 is bolted in place in the rabbet between a shoulder 26 and the central step 25. The rim member 10 is brought into place with its annular flange 14 abutting the lateral ring 24 and the other ring 24 placed on the other side and bolted to the hub member. The L-shaped rings are then screwed on at the two ends of hub member 20. The rubber diaphragms 30, 30 are placed in position with their inner or proximal beads 31, 31 received in the respective annular grooves 21, 21, of the L-shaped rings 22, 22 and with their distal or peripheral beads 37 received in the respective annular grooves 7, 7 of rim member 10. The hub rings 43, 43 and the perimetric rings 48, 48 are then bolted on to secure the rubber diaphragms to the hub member and to the rim member, respectively. It is understood that when the rubber diaphragms are attached as described. the L-shaped rings 22, 22 are in positions close to the central plane D—D, so that the rubber diaphragms as initially assembled are under no tension. The diaphragms are conditioned under tension in the following manner: Holding the rim member 10 stationary, the hub member 20 is turned to cause the L-shaped ring members, 22, 22, by reason of the aforesaid right-and-left threads, to move outwardly to the position shown in Fig. 1, placing rubber diaphragms 30, 30 under tension. The L-shaped rings 22, 22 are then secured in place, as by means of bolts 22×. The outer end of the hub member is closed by a plate 6 held in place in any suitable manner, as by strip springs 6× which snap into the inner bore of hub member 20.

The load of the vehicle or airplane concentrated at the hub member 20 is carried by the rim member 10, being transmitted to the upper portion of the rim by that portion of the rubber diaphragms 30, 30 disposed between the upper rim portion and the wheel hub, the vehicle load being thus carried by suspension from the rim, so that the rubber diaphragms in supporting the vehicle are placed under tension, no part thereof being in compression.

Lateral or axial movement of the hub member 10 relative to rim member 20, or conversely, such movement of the rim and tire relative to the hub member or brake-drum and axle, is effectively restrained by the positive positioning afforded by the pair of spaced lateral rings 24, 24 (secured firmly to the hub) between which the annular flange 14 of the rim is blocked against lateral or axial movement. Rim flange 14, however, its slidably within the channel between hub rings 24, 24, so that diametrical movement between the rim and hub is not restrained. An annular band 4 of rubber or the like is secured to the central step 25 to serve as a buffer to absorb shock when positions of the inner edge of annular rim flange abuts the central step 25, which serves as a positive stop to limit the extent of stretching of rubber diaphragms 30, 30.

It will be noted that in the form of the invention shown in Figs. 1–2, the rim flange 14 is annular and continuous, and that the hub or lateral rings 24, 24 are similarly annular and continuous. The lateral stabilizing means may be discontinuous, i. e., provided at annularly spaced points. This form of the invention is shown in Figs. 3–4, wherein the rim member 10, hub member 20 and rubber diaphragms are the same as in Figs. 1–2, these and associated parts bearing identical reference characters. The annular flange 14, Fig. 1, is, however, omitted in Figs. 3–4, and instead the rim member 10 is provided with a plurality (four being shown, by way of example, in Fig. 4) of inwardly-directed radial spokes 5, the distal ends of which are not secured to hub member 20. The lateral rings 54, 54 are similar to the lateral rings 24, 24 of Fig. 1 and are similarly disposed on, and secured to, hub member 20; but, instead of being spaced apart as in Fig. 1, the facing side of the two rings 54, 54 abut, as clearly shown at 56, Fig. 3, at the lower part of the wheel. Each of the facing sides of the rings 54, 54 is provided with a semi-cylindrical cavity which match to form a cylindrical bore 55 in which the ends of radial rim spokes 5 are slidably received.

I claim:

1. In a vehicle wheel of the load-suspended type having a pair of rubber diaphragms and positionable on the brake-drum of the vehicle axle assemblies, the combination of a tire rim to which the peripheral edges of the pair of rubber diaphragms are secured, having an inwardly-directed annular flange, a tubular hub member of an internal diameter to receive the said brake-drum, a pair of lateral rings secured to the hub member in spaced facing relation to provide a deep, annular channel for slidably receiving the distal portion of said rim flange, said hub member being externally threaded right-and-left handedly at its respective ends, and a pair of correspondingly tapped, annular elements screwed on said respective ends of the hub member for securing the proximal edges of the rubber diaphragms, said diaphragm-securing elements being outwardly advanced to tension the rubber diaphragms, and means for securing said elements to the hub member in outwardly advanced positions.

2. In a vehicle wheel of the load-suspended type having a pair of rubber diaphragms and positionable on the brake-drum of the vehicle axle assemblies, the combination of a tire rim to which the peripheral edges of the pair of rubber diaphragms are secured, having an inwardly-directed annular flange, a tubular hub member of an internal diameter to receive the said brake-drum, a pair of lateral rings secured to the hub member in spaced facing relation to provide a deep, annular channel for slidably receiving the distal portion of said rim flange, annular elements disposed at the respective ends of the hub member for securing the proximal edges of the rubber diaphragms, said diaphragm-securing elements being axially movable on the hub member and outwardly advanced to tension the rubber diaphragms.

3. In a vehicle wheel of the load-suspended type having a pair of rubber diaphragms, the combination of a tire rim to which the peripheral edges of the pair of rubber diaphragms are secured, having an inwardly-directed annular flange, a hub member, a pair of lateral rings secured to the hub member in spaced facing relation to provide a deep, annular channel for slidably receiving the distal portion of said rim flange, said hub member being externally threaded right-and-left handedly at its respective ends, and a pair of correspondingly tapped, annular elements screwed on said respective ends of the hub member for securing the proximal edges of the rubber diaphragms, said diaphragm-securing elements being outwardly advanced to tension the rubber diaphragms, and means for securing said elements to the hub member in outwardly advanced positions.

HENRY W. WALDEN.

REFERENCES CITED

The following references are of record in the file of this patent:

UNITED STATES PATENTS

| Number | Name | Date |
| --- | --- | --- |
| 1,063,100 | Woodless | May 27, 1913 |
| 1,446,922 | Morse | Feb. 27, 1923 |
| 1,527,037 | Erickson | Feb. 17, 1925 |
| 1,588,481 | Lord | June 15, 1926 |